United States Patent
Shah et al.

(10) Patent No.: US 7,181,522 B2
(45) Date of Patent: Feb. 20, 2007

(54) METHOD AND APPARATUS FOR CALL SETUP WITHIN A VOICE FRAME NETWORK

(75) Inventors: Dhaval N. Shah, Fremont, CA (US); Michael E. Tasker, Pleasanton, CA (US); Neil R. Joffe, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/934,827

(22) Filed: Sep. 2, 2004

(65) Prior Publication Data
US 2005/0027861 A1 Feb. 3, 2005

Related U.S. Application Data

(63) Continuation of application No. 09/606,824, filed on Jun. 28, 2000, now abandoned.

(51) Int. Cl.
*G06F 15/173* (2006.01)
(52) U.S. Cl. .................... 709/224; 709/223
(58) Field of Classification Search ............. None
See application file for complete search history.

(56) References Cited

U.S. PATENT DOCUMENTS

| | | | | |
|---|---|---|---|---|
| 5,805,818 A | * | 9/1998 | Perlman et al. | 709/224 |
| 5,915,001 A | * | 6/1999 | Uppaluru | 379/88.22 |
| 6,405,248 B1 | * | 6/2002 | Wood | 709/223 |
| 6,434,528 B1 | * | 8/2002 | Sanders | 704/275 |
| 6,466,550 B1 | * | 10/2002 | Foster et al. | 370/261 |
| 6,577,642 B1 | * | 6/2003 | Fijolek et al. | 370/465 |
| 6,600,734 B1 | * | 7/2003 | Gernert et al. | 370/352 |
| 6,760,324 B1 | * | 7/2004 | Scott et al. | 370/352 |
| 2004/0225750 A1 | * | 11/2004 | Lim et al. | 709/245 |

OTHER PUBLICATIONS

Miyata, Teruko et al. "New Network QoS Measures for FEC-Based Audio Applications on the Internet," Feb. 1998, IEEE, pp. 355-362.*
Wong, Wai-Choong et. al. "Shared Time Division Duplexing: An Approach to Low-Delay High-Quality Wireless Digital Speech Communications," Nov. 1994, IEEE, vol. 43, Issue 4, pp. 934-945.*
Lee, Young J. and Riley, George F. "Dynamic Nix-Vector Routing for Mobile Ad Hoc Networks," 2000, IEEE, pp. 1995-2001.*

* cited by examiner

*Primary Examiner*—Patrice Winder
*Assistant Examiner*—Azizul Choudhury
(74) *Attorney, Agent, or Firm*—Marger Johnson & McCollom, P.C.

(57) ABSTRACT

The method involves transmitting plural endpoint probes to produce plural endpoint probe results indicating the preparedness of the endpoints for calls routed thereto; identifying similarly situated endpoints; and representing each of the similarly situated endpoints by a reduced number of recorded endpoint probe results that substantially represent the inter-connective preparedness of each of the similarly situated endpoints. The apparatus includes a mapping mechanism for mapping the probe results for the similarly situated endpoints into a reduced number of endpoint probe results that substantially represent the inter-connective preparedness of each of the similarly situated endpoints, and a recording mechanism for recording the reduced number of endpoint probe results. Such mapping permits an Internet operating system (IOS) router/gateway to act as an real-time responder/service assurance agent (RTR/SAA) proxy on behalf of non-RTR/SAA capable voice over Internet protocol (VoIP) endpoints.

36 Claims, 2 Drawing Sheets

METHOD AND APPARATUS FOR CALL SETUP WITHIN A VOICE FRAME NETWORK

BACKGROUND OF THE INVENTION

This application is a continuation of prior U.S. Ser. No. 09/606,824, filed Jun. 28, 2000, now abandoned entitled "METHOD AND APPARATUS FOR CALL SETUP WITHIN A VOICE FRAME NETWORK".

This invention relates to Internet protocol (IP) network systems in which voice or other data are sent in packets from a server to a client or vice versa. More specifically, it concerns method and apparatus for endpoint source and destination call setup within a voice over Internet protocol (VoIP) or similar voice frame network.

Detecting, and optionally routing around, voice frame network congestion typically is performed by a method that is similar to Internet protocol (IP) pinging. Those of skill in the art will appreciate that pinging is a method by which real-time responder (RTR) or service assurance agent (SAA) endpoint probes are transmitted and echoed across the network at call setup time to determine the inter-connective preparedness of endpoints for incoming calls.

A network endpoints coordination protocol (NECP) may measure network latency between network endpoints, as described in co-pending U.S. patent application Ser. No. 09/346,080 entitled A PROTOCOL TO COORDINATE NETWORK END POINTS TO MEASURE NETWORK LATENCY, filed Jul. 1, 1999, the disclosure of which is incorporated herein by reference. Network endpoints metrics such as data packet delay, jitter and loss may be obtained, as described in co-pending U.S. patent application Ser. No. 09/434,845 entitled METHOD AND APPARATUS FOR MEASURING NETWORK DATA PACKET DELAY, JITTER AND LOSS, filed Nov. 4, 1999, the disclosure of which also is incorporated herein by reference. These protocol, method and apparatus rely on RTR/SAA endpoint probe transmission and echoing with or without content modification. Both patent applications are subject to common ownership herewith by assignee Cisco Technology, Inc.

One recently proposed VoIP congestion detection method permits the endpoint probe to emulate a burst of actual voice packets. This provides improved fidelity to the probe results compared with a simple IP ping. The mechanism involves sending an RTR/SAA probe to the IP address of the far-end voice gateway prior to attempting a call setup to the gateway. To increase efficiency, and to reduce post-dialing delay, the voice gateway that originates the call keeps a cache of recent RTR/SAA probe results.

The cache allows the gateway to consolidate probe requests from plural voice ports and associated call attempts, so that a single probe test and results is shared by all voice ports and call attempts on a voice gateway. This reduces the volume of IP network traffic and congestion generated by the RTR/SAA probes themselves. This is particularly useful in conjunction with network maintenance techniques that continuously send probes to a far-end gateway to confirm connectivity on a pre-emptive basis, rather than simply at call setup time.

This probe result caching scheme suffers from the limitation that the number of IP addresses available as targets for VoIP calls is likely to be larger than any reasonable RTR/SAA cache size. The cache entries typically store an RTR/SAA probe result for each IP address corresponding with each distant voice gateway or VoIP endpoint. When this mechanism is used with an IP private branch exchange (PBX), each individual IP phone as part of the IP PBX may have an individual IP address. Accordingly, each individual IP phone may contribute an individual IP probe cache entry, which requires an unreasonable amount of caching time and resource, e.g. memory.

Moreover, not all IP targets or VoIP endpoints support RTR/SAA probe/response queries. In these cases, it is not possible to perform either initial or periodic connectivity confirmation.

SUMMARY OF THE INVENTION

This invention recognizes that the RTR/SAA probes for a group of IP phones or voice gateways situated on the same IP sub-net are likely to have almost identical RTR/SAA probe results. A significant saving in the RTR/SAA probe cache size may be obtained by consolidating the RTR/SAA probe results for a group of similarly situated IP phones or voice gateways and consolidating such probe results into a single cache entry. This mechanism also greatly increases the cache hit rate, since a call to a single phone within the distant IP PBX will provide a cached RTR/SAA result to other phones within the same IP PBX group. Cache consolidation is obtained by mapping of individual IP addresses obtained during the normal VoIP call setup process into a single IP address that is designated to represent the IP phone/gateway group. Moreover, such mapping permits an Internet operating system (IOS) router/gateway to act as an RTR/SAA responder proxy on behalf of any non-RTR capable VoIP endpoints. Accordingly, the invention may be thought of as involving both destination-consolidation, e.g. consolidating VoIP endpoint probe results, and source-consolidation, e.g. consolidating gateway endpoint probe results.

Preferably, the method involves transmitting plural endpoint probes to produce plural endpoint probe results indicating the preparedness of the endpoints for calls routed thereto; identifying similarly situated endpoints; and representing each of the similarly situated endpoints by a reduced number of recorded endpoint probe results that substantially represent the inter-connective preparedness of each of the similarly situated endpoints. Preferably, the apparatus includes a mapping mechanism for mapping the probe results for the similarly situated endpoints into a reduced number of endpoint probe results that substantially represent the inter-connective preparedness of each of the similarly situated endpoints, and a recording mechanism for recording the reduced number of endpoint probe results.

The foregoing and other objects, features and advantages of the invention will become more readily apparent from the following detailed description of a preferred embodiment which proceeds with reference to the drawings.

DETAILED DESCRIPTION OF THE INVENTION

Figure 1:
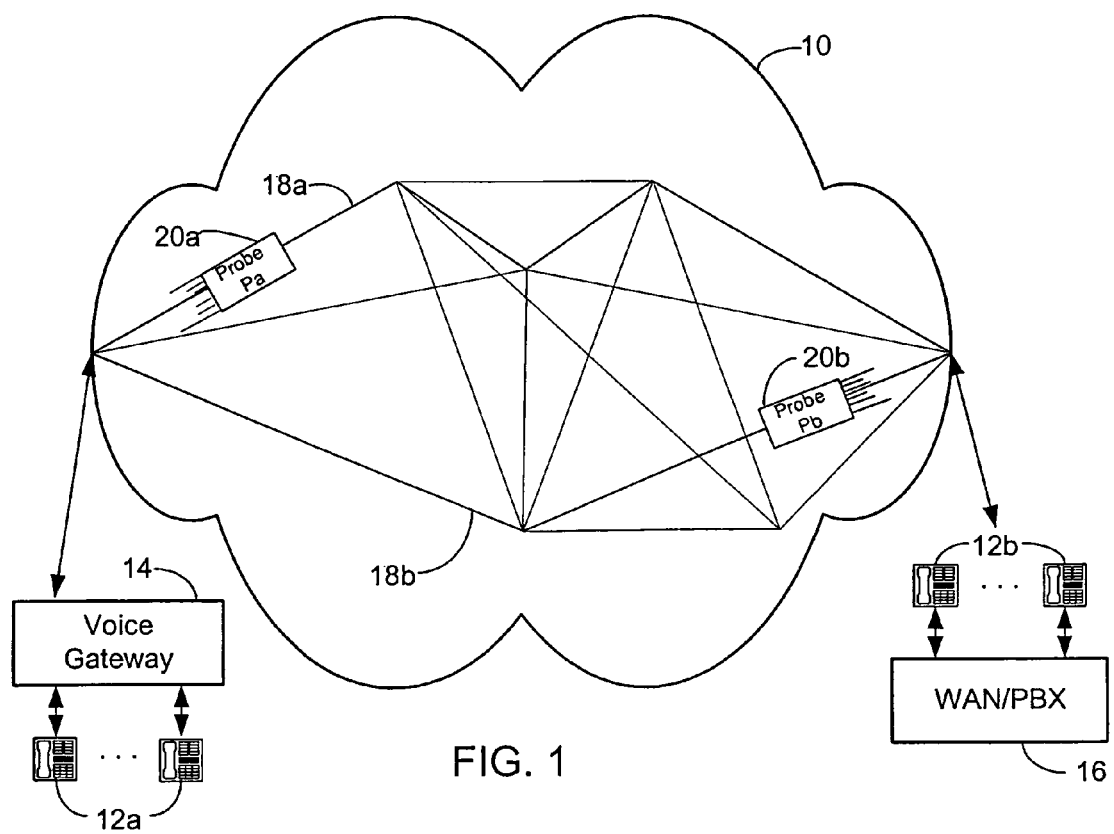
FIG. 1 is a system block diagram illustrating a voice frame network of which the invented method and apparatus of the invention are a part.

FIG. 1 shows a network 10 such as the world-wide web or Internet operatively connecting one or more Internet protocol (IP) phones 12a, 12b via a voice gateway 14 and a WAN or PBX 16. Those of skill in the art will appreciate that plural paths such as paths 18a, 18b extend through network 10, providing alternative routing of voice or data through the network. In accordance with the invention, RTR/SAA one or more probes 20a, 20b are routed through network 10 over such paths 18a, 18b between what will be referred to herein as IP endpoints. IP endpoints, as used herein, refers broadly to IP phones 12a, 12b, gateway 14, WAN or PBX 16, or to routers (not shown) connected thereto. Such routing of RTR/SAA probes may take the form of an IP ping mechanism, or, more preferably, may take the form of the SAA probe mechanism described and illustrated in the above-referenced co-pending patent applications. Such may be referred to herein broadly as pinging, which will comprehend both the simple IP ping echo and the more sophisticated performance metric techniques, and any such pinging or endpoint probing method and apparatus whereby a query packet is transmitted and a response packet is returned from a remote endpoint are within the spirit and scope of the invention.

FIG. 1 shows a probe pair, which will be understood to represent two different periods of time, wherein a first probe Pa is transmitted from voice gateway 14 to WAN/PBX 16 and a second, responsive, probe Pa is transmitted from WAN/PBX 16 back to voice gateway 14. The invented method and apparatus recognize that WAN/PBX may stand in for IP phones 12b as representative of the readiness of IP phones 12b to respond to a call from IP phones 12a. The invented method and apparatus also recognize that voice gateway 14 may stand in for IP phones 12a as representative of the readiness of IP phones 12a to respond to a call from IP phones 12b. Thus, the invention involves mapping the IP address of any or all of plural IP phones 12a into the IP address of voice gateway 14 and of any or all or plural IP phones 12b into the IP address of WAN/PBX 16, for purposes of testing interconnectivity.

It will be understood that such mapping for representation purposes is a very useful way to save cache space. This is because heretofore the IP address of each and every IP phone or endpoint required an individual cache entry in memory to maintain the interconnectivity status of the IP phones or endpoints. Prior to the present invention, memory requirements tended to grow without bounds. This lowered the likelihood of a cache hit when a router was attempting to determine the status of a particular IP endpoint, since only a limited number of IP endpoint status blocks could be represented as a cache entry at any particular point in time. With the present invention, the total number of IP endpoint status blocks is greatly reduced, by the mapping of plural ones of such IP endpoint addresses into a reduced number of representative IP endpoint addresses. Thus, cache size is greatly reduced and the likelihood of a cache hit is greatly increased.

Interconnective readiness of a particular IP endpoint is represented accurately, in accordance with the invention. This is because the mapping, in accordance with the invention, is of a particular IP address into a different IP address that is substantially representative of the particular IP address. Network proximity between the targeted IP address and the representative IP address ensures the high fidelity of the representation. For example, most of the network voice data packet delay, jitter and loss occurs at the nodes along circuitous paths 18a, 18b between voice gateway 14 and WAN/PBX 16. In other words, very little occurs at the endpoint nodes themselves, e.g. in the routers directly coupled with gateway 14 or WAN/PBX 16, so that the delay, jitter and loss between the IP phones themselves may be accurately represented by the delay, jitter and loss between the associated gateway and WAN/PBX.

Those of skill in the art will appreciate that the invention preferably takes the form of software routines that reside in voice gateway 14 and WAN/PBX 16. This renders the invention relatively low cost and easily provided to enhance the value of the installed base of gateway and WAN/PBX endpoints. Thus, no hardware is needed and no modifications other than the installation, e.g. downloading, of software is required to realize the advantages of the invention.

Figure 2:
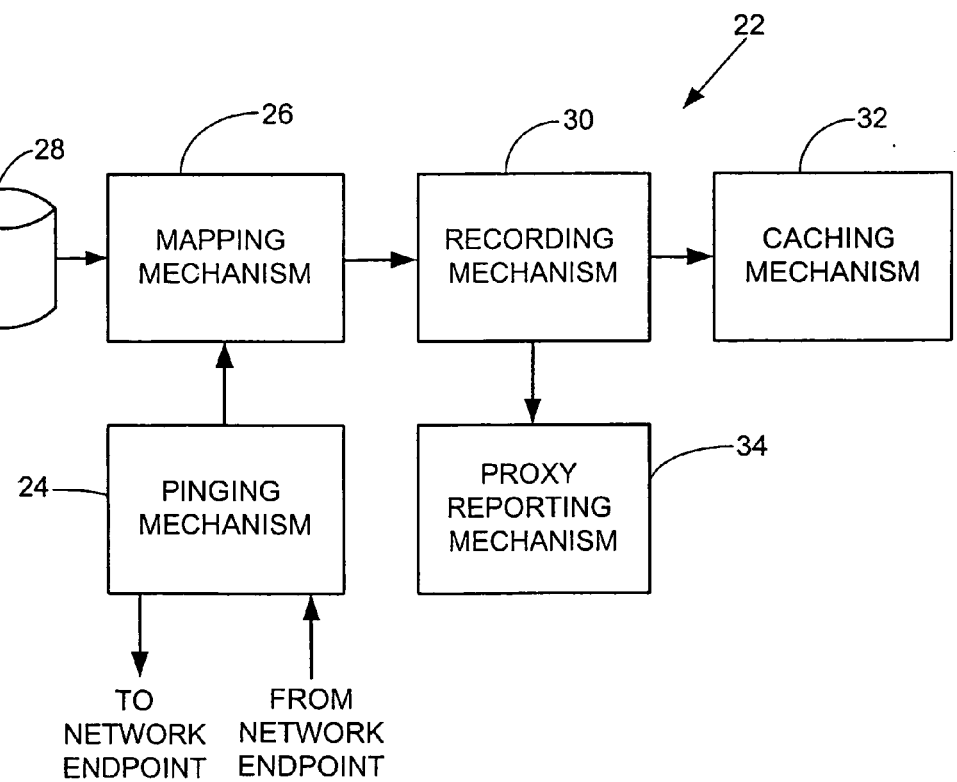
FIG. 2 is a more detailed schematic diagram of the apparatus in accordance with a preferred embodiment of the invention.

FIG. 2 shows apparatus 22 in schematic block diagram form. Apparatus 22 preferably includes a pinging mechanism 24, which may take any suitable form as discussed above. Apparatus 22 further includes a mapping mechanism 26 capable of mapping plural IP addresses into a reduced number of plural IP addresses representative thereof for pinging purposes. Mapping mechanism 26 may have associated therewith a database 28, indicated in FIG. 2 as a disk drive. It will be appreciated that the database may take any suitable form, and simply provides an associated between two or more IP phone addresses and a representative endpoint IP address. Alternatively, mapping mechanism may rely on the basic rule set forth above, or any other suitable mapping rule or rules.

Apparatus 22 preferably further includes a recording mechanism 30, e.g. a memory, for storing the result of the mapping produced by mapping mechanism 26. Recording mechanism may be operatively connected, in accordance with the invention, to a caching mechanism 32 as described by which fewer than all such IP phone addresses are stored in non-volatile, random access memory for instant access. Recording mechanism also may be operatively connected, in accordance with the invention, to a proxy reporting mechanism 34 as described. Thus, endpoint probe results such as voice data packet delay, jitter and loss may be reported to supervisory or performance assurance software based upon the stored, representative probe results. Proxy refers to the fact that an IP endpoint such as voice gateway 14 or WAN/PBX acts for reporting purposes as representative of an IP phone 12a or 12b for purpose of reporting endpoint probe results indicative of interconnectivity preparedness.

Individual IP addresses obtained during a normal VoIP call setup process that includes pinging are mapped to a single IP address designed to represent the IP phone/gateway group. In many cases, the mapping may replace the IP address of any individual distant IP phone/gateway with the IP address of a wide-area network (WAN) access router that connects the IP phone/gateway group to the WAN. The IP mapping can be performed in any suitable way. For example, a list of IP phone/gateway IP addresses accessible through the WAN access router may be maintained in memory. Alternatively, an IP sub-net may be identified using the following mapping rule: Any IP phone/gateway contained within the IP sub-net is represented (for RTR/SAA probe purposes) by the IP address of the WAN access router associated with the IP sub-net.

Yet other alternatives are possible, and are within the spirit and scope of the invention. For example, a database server may identify group membership, i.e. groups of individual members may be identified as representative of those members, thereby defining the mapping in accordance with the invention. The mapping mechanism then would simply do a database look-up, e.g. using database 28, to determine the representative, or proxy, IP address for the individual members. Thereafter, unless the membership definition changed, the RTR/SSA responder for the individual members would be represented by the RTR/SSA responder for the IP address of the group to which the members are assigned by the database.

Figure 3:
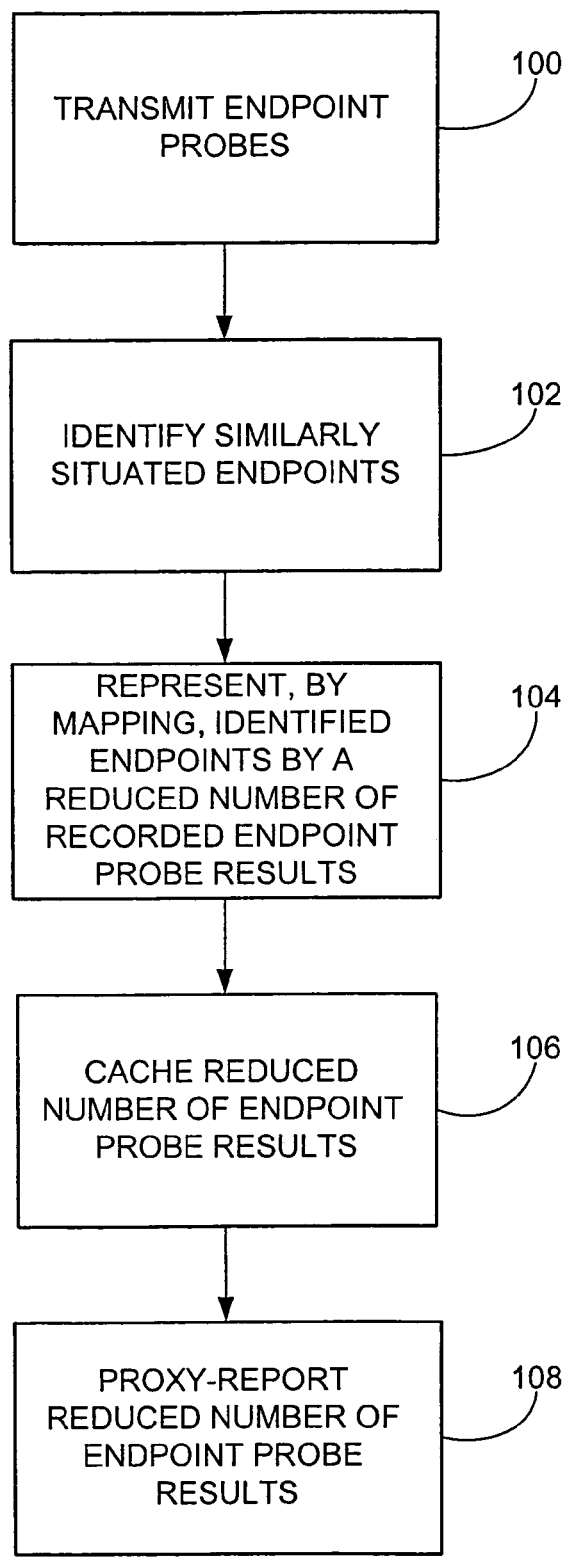
FIG. 3 is a flowchart illustrating the method in accordance with a preferred embodiment of the invention.

FIG. 3 illustrates the invented method in accordance with a preferred embodiment in the form of a flowchart. At 100, plural endpoint probes are transmitted to remote IP phone addresses to produce plural endpoint probe results indicating the preparedness of the endpoints for calls routed thereto. At 102, similarly situated ones of the plural endpoints are identified, as described above, preferably by their individual network addresses. At 104, each of the similarly situated ones of the plural endpoints is represented by a reduced number of recorded endpoint probe results that substantially represent the preparedness of each of the similarly situated endpoints. Preferably, such representation is performed by mapping the network addresses of the identified ones of the similarly situated endpoints into a network address that is representative of the similarly situated endpoints. Optionally, such representation also involves recording the endpoint probe results for the network address of the group as representative of the preparedness of the similarly situated endpoints.

At 106, the reduced number of stored endpoint probe results for each group of similarly situated endpoints is cached, so that representative probe results are readily accessible to supervisory or performance assurance software without undue latency or overhead. At 108, the reduced number of recorded endpoint probe results are proxy-reported as representative of one or more of the similarly situated endpoints. Those of skill in the art will appreciate that typically at least one of the endpoints includes an IP phone such as any one of IP phones 12*a*, 12*b*, which IP phone typically may be connected with WAN/PBX 16. Those of skill in the art also will appreciate that typically at least one of the endpoints includes an IP voice gateway 14.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention. Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. A method of analyzing network endpoint probing results, the method comprising:
    transmitting or receiving a plurality of endpoint probes associated with multiple different endpoint addresses;
    identifying a group of the multiple endpoint addresses associated with a same network domain;
    using a reduced number of network addresses less than a total number of the identified endpoint addresses to identify probe results for all of the identified endpoint addresses; and
    caching all of the identified endpoint addresses in the reduced number of network addresses thereby reducing a total amount of cache required to store network preparedness results for the identified endpoint addresses.

2. The method of claim 1 including receiving probe results for the individual endpoint addresses in the identified group and using a single network processing device address to identify the probe results for all of the individual endpoint addresses.

3. The method of claim 1 including using probe results for one of the identified endpoint addresses to represent probe results for multiple ones of the identified endpoint addresses.

4. The method of claim 1 including associating at least one of the reduced network addresses with a Public Branch Exchange (PBX) and associating multiple ones of the identified endpoint addresses with Internet Protocol (IP) phones.

5. The method of claim 1 including associating at least one of the identified endpoint addresses with an Internet protocol (IP) voice gateway.

6. An apparatus for consolidating plural endpoint probing results into a reduced number of representative endpoint probing results, the apparatus comprising:
    a mapping mechanism for mapping probe results for multiple endpoints into a reduced number of endpoint probe results that substantially represent the preparedness of each of the multiple endpoints, the mapping mechanism identifying the multiple endpoints within a network by their individual network addresses and mapping endpoint probe results associated with the individual network addresses into a same network address that is representative of the endpoints;
    a recording mechanism for recording the reduced number of endpoint probe results and associating the reduced number of endpoint probe results with the same network address; and
    a proxy reporting mechanism for reporting the reduced-and-recorded endpoint probe results as representative of one or more of the multiple endpoints that is mapped by said mapping mechanism into such reduced-and-recorded endpoint probe results.

7. The apparatus of claim 6 which further comprises: a caching mechanism for caching the reduced-and-recorded probe results for the multiple endpoints.

8. The apparatus of claim 7 which further comprises:
    a pinging mechanism for producing the probe results for the multiple endpoints, said pinging mechanism testing the multiple endpoints to determine the preparedness thereof for calls routed thereto.

9. The apparatus of claim 6, wherein at least one of the multiple endpoints includes an Internet protocol (IP) phone.

10. The apparatus of claim 6, wherein at least one of the multiple endpoints includes an Internet protocol (IP) voice gateway.

11. The apparatus of claim 6 wherein the mapping mechanism does not map each probe result into an endpoint probe result.

12. The apparatus of claim 11 wherein each endpoint probe result corresponds to a cache entry.

13. The apparatus of claim 6 wherein the mapping mechanism maps the probe results for multiple endpoints into a reduced number of endpoint probe results because probe results for a plurality of the endpoints are mapped into a single endpoint probe result.

14. The apparatus of claim 13 wherein the plurality of endpoints are associated with a same network domain.

15. A voice frame network address consolidation method for use with multiple endpoints to determine their interconnectivity preparedness, the method comprising:
    identifying the multiple endpoints within a voice frame network by their individual network addresses;
    mapping the network addresses of the identified endpoints into a single network address that is representative of the multiple endpoints;
    utilizing pinging results for the mapped-to network address to represent the interconnectivity preparedness of the multiple endpoints;
    assigning a cache entry for the pinging results; and
    mapping the cache entry to each of the multiple endpoints.

16. The method of claim 15, wherein at least one of the endpoints includes an Internet protocol (IP) phone.

17. The method of claim 15, wherein at least one of the endpoints includes an Internet protocol (IP) voice gateway.

18. A computer-readable medium containing a program for consolidating voice frame network address endpoint probe results to determine interconnectivity preparedness, the program comprising:
    instructions for identifying multiple endpoints within a network by their individual network addresses;
    instructions for mapping the network addresses of the identified multiple endpoints into a single network address that is representative of the multiple endpoints;
    instructions for utilizing pinging results for the mapped-to network address to represent the interconnectivity preparedness of the multiple endpoints that are mapped thereto;
    instructions for assigning a cache entry for the pinging results; and
    instructions for mapping the cache entry to each of the multiple endpoints.

19. The computer-readable medium in accordance with claim 18, wherein at least one of the multiple endpoints includes an Internet protocol (IP) phone.

20. The computer-readable medium in accordance with claim 18, wherein at least one of the multiple endpoints includes an Internet protocol (IP) voice gateway.

21. An apparatus for consolidating plural endpoint probe results into a reduced number of representative endpoint probe results, the apparatus comprising:
    means for identifying endpoints within a voice frame network by their individual network addresses;
    means for mapping the network addresses of the identified ones of the endpoints into a network address that is representative of the endpoints;
    means for utilizing pinging results for the mapped-to network address to represent the interconnectivity preparedness of the endpoints that are mapped thereto;
    means for assigning a cache entry for the pinging results; and
    means for mapping the cache entry to each of the multiple endpoints.

22. The apparatus of claim 21 wherein at least one of the endpoints includes an Internet protocol (IP) phone.

23. The apparatus of claim 22, wherein at least one of the endpoints includes an Internet protocol (IP) voice gateway.

24. The apparatus of claim 21 wherein the pinging results are received in response to sending a probe that emulates a burst of voice packets.

25. The apparatus of claim 24 wherein the probe is a Response Time Reporter/Service Assurance Agent (RTR/SAA) probe.

26. An apparatus for use with a Private Branch Exchange or Voice Gateway (PBX-VG) comprising:
    a mapping mechanism to map cache entries for network elements;
    a database to associate the PBX-VG with multiple phones in response to a determination that the PBX-VG and the multiple phones are all part of a same Internet Protocol (IP) subnet and to provide said association to said mapping mechanism;
    a probing mechanism to send a voice data congestion probe emulating a burst of voice packets and to receive back a voice data congestion probe result for the PBX-VG;
    a cache controller to assign a cache entry for the voice data congestion probe result;
    said mapping mechanism to map the cache entry to each of the PBX-VG and the multiple phones in response to said providing;
    a pointer to identify said mapping by a network address for said IP subnet;
    wherein the cache controller is configured to provide the probe result in response to voice data packet delay, jitter or loss inquiries for any of the multiple phones; and
    wherein one cache entry represents the PBX and the multiple phones.

27. Logic encoded in one or more tangible media for execution and when executed operable to:
    ping first and second remote endpoints using separate communications;
    receive back separate responses at a local network device that identify a first pinging result for the first remote endpoint and a second pinging result for the second remote endpoint;
    determine whether the first and second remote endpoints are located on a same private network;
    store only the first pinging result in a single cache entry in a cache and do not store the second pinging result in the cache when the first and second remote endpoints are located on the same private network;
    associate the first and second remote endpoints in a mapping mechanism that is independent of the cache, separate from the cache and non-integrated with the cache; and
    configure the cache and the mapping mechanism to provide the first pinging result in response to a request for a latency measurement between the local network device and the second remote endpoint after associating the first and second remote endpoints in the mapping mechanism.

28. The logic of claim 27 further operable to:
    store both the first and second pinging results in different cache entries in the cache when the first and second remote endpoints are not located on the same private network; and
    configure the cache and the mapping mechanism to provide the second pinging result in response to a request for the latency measurement between the local network device and the second remote endpoint after storing the second pinging result in one of the different cache entries in the cache.

29. The logic of claim 27 further operable to:
    receive a call request for a call from the local network device to the second remote endpoint;

request the latency measurement between the local network device and the second remote endpoint in response to receiving the call request for the call to the second remote endpoint;

receive the first probe result from the cache when the mapping mechanism associates the first and second remote endpoints; and receive the second probe result from the cache when the mapping mechanism does not associate the first and second remote endpoints.

30. A method comprising:

sending a first emulation of a burst of voice packets from a network device over a publicly addressable network to an access router that provides access to the publicly addressable network from a private network;

receiving back a first response that identifies a first probe result for the first emulation of the burst of voice packets;

sending a second emulation of the same or another burst of voice packets over the publicly addressable network, through the access router, through the private network to an Internet Protocol (IP) phone located in the private network;

receiving back a second response that identifies a second probe result for the second emulation;

comparing a first address for the access router to a second address for the IP phone to identify the private network containing both the access router and the IP phone;

associating the first and second addresses in a table according to the comparison; and storing the first probe result for the access router in a cache entry in a local cache.

31. The method of claim 30, further comprising:

receiving a call request at the network device for a call to a remote endpoint;

comparing a remote address for the remote endpoint to the table responsive to receiving the call request for the call to the remote endpoint;

identifying a subnet address for the first and second addresses when the table associates the remote address with the first address;

providing the subnet address to a cache controller for the local cache when the first address is identified;

hitting the cache entry that includes the first probe results in response to said providing; and establishing the call with the remote endpoint according to the first probe result included in the cache entry.

32. The method of claim 31 wherein the remote address is the second address for the IP phone.

33. The method of claim 31 wherein the remote endpoint is a different IP phone located in the private network.

34. The method of claim 33 wherein the remote address is one of the multitude of addresses.

35. The method of claim 31 wherein the table associates a multitude of addresses for a multitude of remote devices located in the private network with the subnet address.

36. The method of claim 31 wherein the first and second emulations of the burst of voice packets are Response Time Reporter/Service Assurance Agent (RTR/SAA) probes.

* * * * *